Figure 1:
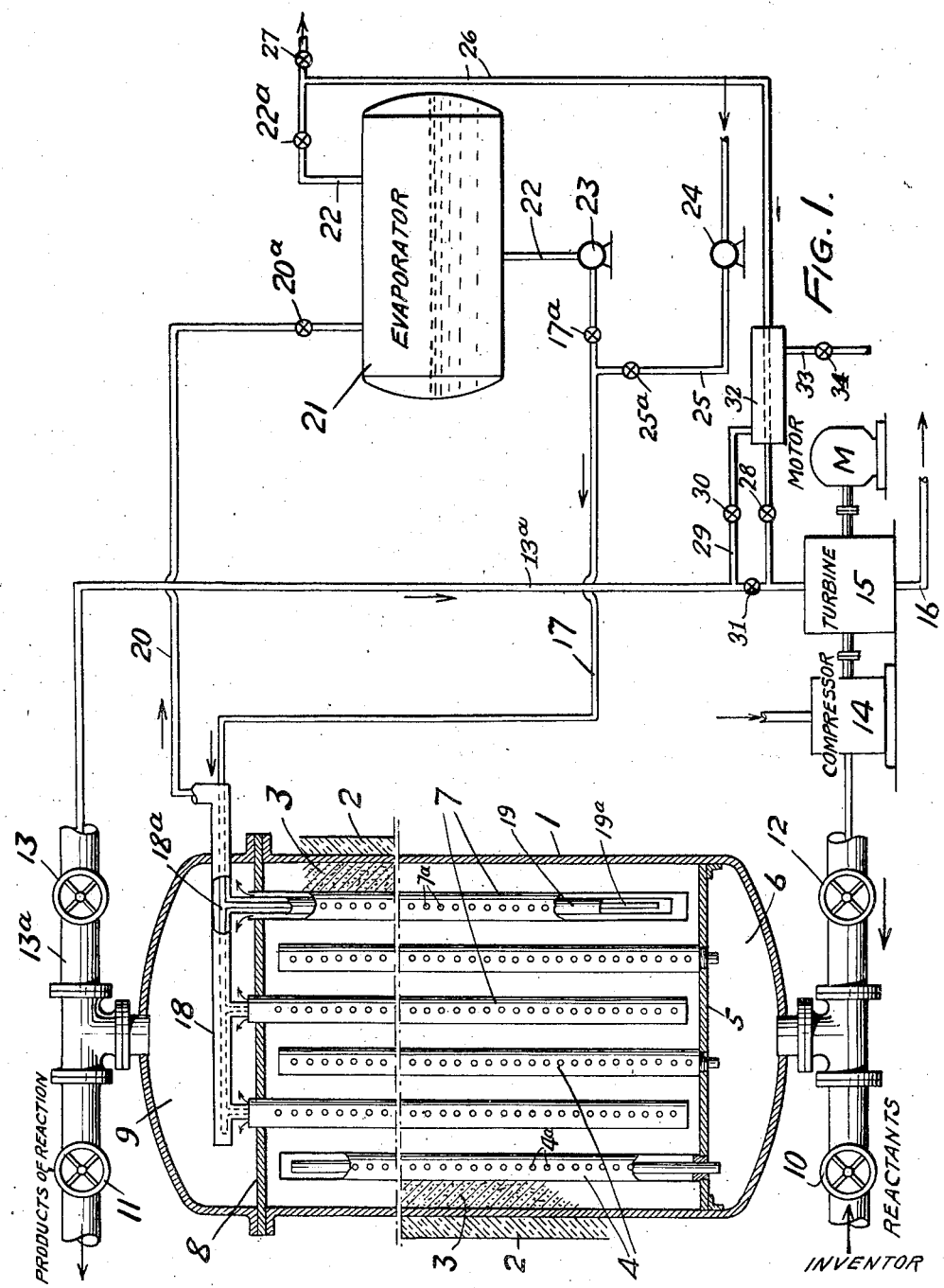

Aug. 1, 1939.  R. S. VOSE  2,167,698
METHOD FOR REGENERATING CATALYTIC MASSES
Filed Jan. 17, 1936  2 Sheets-Sheet 1

WITNESS:
INVENTOR
Richard S. Vose
BY
ATTORNEY

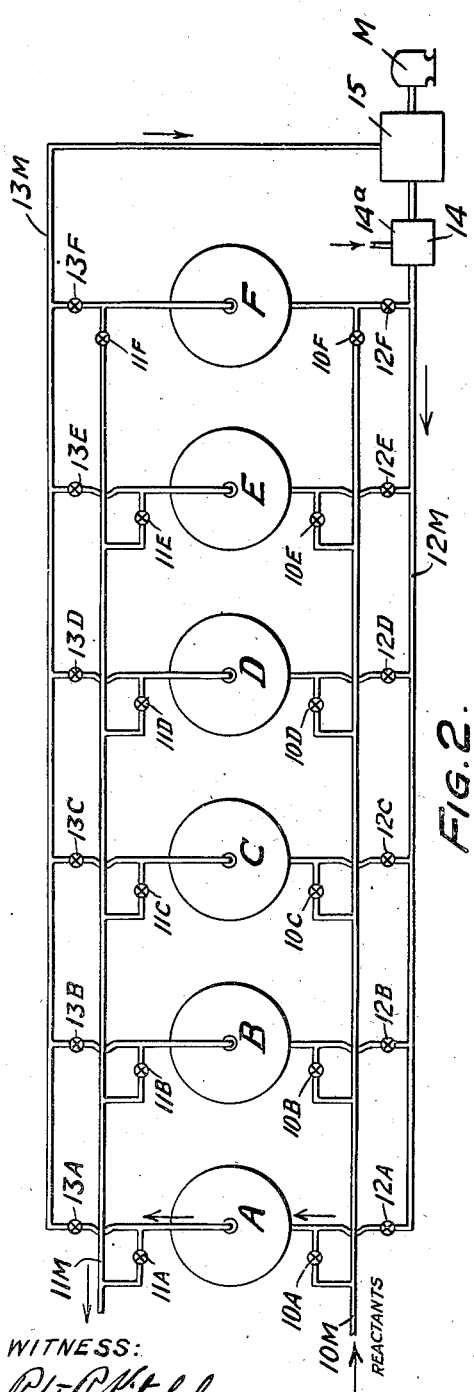
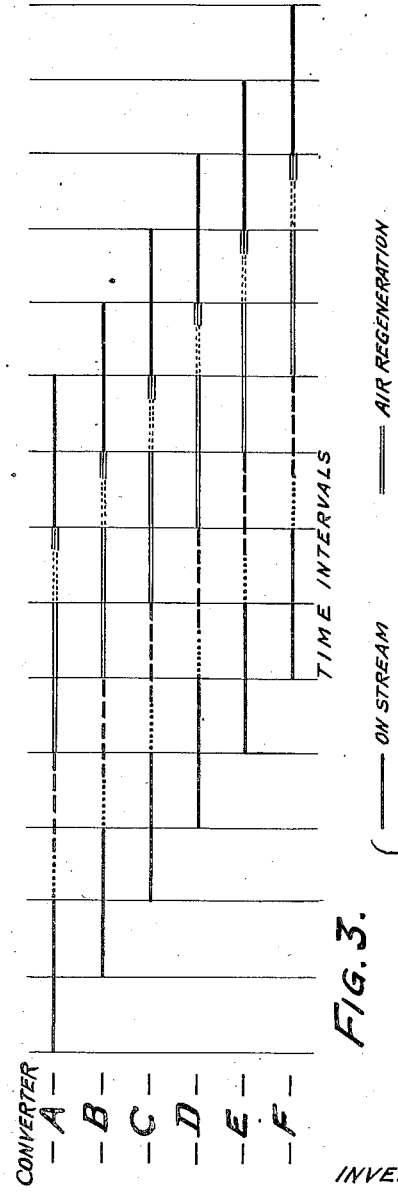

Patented Aug. 1, 1939

2,167,698

UNITED STATES PATENT OFFICE 2,167,698

METHOD FOR REGENERATING CATALYTIC MASSES

Richard S. Vose, Ridley Park, Pa., assignor, by mesne assignments, to Houdry Process Corporation, Wilmington, Del., a corporation of Delaware Application January 17, 1936, Serial No. 59,544

4 Claims. (Cl. 196—52)

The present invention relates to the art of catalysis and particularly to that phase of the art in which contaminants are deposited on a catalytic material during a conversion step and subsequently removed therefrom by a regeneration step.

The invention relates more specifically to catalytic processes in which the contaminants deposited during the conversion or reaction step are of an oxidizable or combustible nature. When such processes are applied to the cracking of hydrocarbon oils in the vapor phase using activated porous adsorptive catalytic material (with or without the addition of metallic salts or oxides as promotors or active catalytic materials) the contaminant is carbon in the form of coke. This has been removed by purging the catalytic mass of residual liquid and vaporous hydrocarbons and then burning out the coke by the admission of air, controlled both as to amount and temperature, so as to avoid overheating and consequent destruction of the catalyst itself. Heretofore the burning or oxidation of the coke from the catalyst has been speeded up by the admission of hotter air and controlling the temperature of regeneration by the placing of water circulating tubes within the catalytic chamber.

I have discovered that the regeneration may be greatly speeded by carrying out this portion of the cycle under pressure of regeneration fluid (air) and the fluids resulting from the regeneration reaction, thereby greatly increasing the space velocity. For instance, when the regeneration step was carried out by means of air at a pressure of 17.5 pounds per square inch absolute, the regeneration time was ninety minutes for a catalytic mass of a given volume, while when the regeneration was carried out at 40.5 pounds per square inch absolute, the regeneration time was cut to fifteen minutes for the same volume of catalyst. The advantages of such procedure are obvious, resulting either in the diminution of the amount of catalyst necessary for a given throughput or greatly raising the capacity of a given amount of catalyst.

There is, however, one great disadvantage in pressure regeneration, namely the cost of compressing the air or other oxygen-containing gas for use in the regeneration. For instance, the cost of feeding such gas at about 17.5 pounds per square inch absolute to a catalytic mass of given volume, compared with the cost of compressing the fluid for regeneration to 40.5 pounds per square inch, is about one to eleven or twelve. Such high compression costs would, of course, render high pressure regeneration uneconomical, unless some means were found for reducing it.

I have further discovered that the combustion products of pressure regeneration emerging from the catalyst have sufficient energy for furnishing the power necessary for the compression of the regenerating medium when the energy is properly transformed. It is therefore an object of the present invention to provide a process and apparatus for regenerating catalysts contained therein under pressure. It is a further object of the invention to utilize the energy contained in the stream of combustion or oxidation products emerging from the catalyst chamber to compress the regeneration medium to be fed to the catalytic chamber.

It is a further object of the invention to recover an appreciable amount of the heat of regeneration in the form of steam.

These and other objects and advantages, as well as a quick understanding of the invention, can most readily be gained by reference to the accompanying drawings, in which Fig. 1 is a semi-diagrammatic elevational view showing a converter together with auxiliary equipment for sending a regeneration medium therethrough at desired high pressure and for utilizing the energy developed during the regeneration;

Fig. 2 shows in a semi-diagrammatic plan view an arrangement of a plurality of converters and valves and ducts for controlling the cycle of on-stream operation and regeneration of each as desired; and Fig. 3 shows an illustrative manner in which to relate the cycle of operation in the several converters to each other.

Referring more in detail to the drawings, in the several figures of which like reference characters denote similar parts, 1 is a converter surrounded by suitable heat insulation, 2 comprising a reaction chamber substantially filled with contact mass 3. The chamber has conduits 4, which are of the double or nested type, having perforations 4a therein, and being embedded in the contact mass 3 within the reaction chamber. The inner member of the nested conduit 4 communicates through tubesheet 5 with manifolding chamber 6, which latter, for purposes of illustration, may be considered as an inlet manifolding chamber and conduits 4 may be considered as inlet conduits. Conduits 7, having perforations 7a therein, communicate through tube sheet 8 with manifolding chamber 9, which latter may be considered as an outlet or withdrawal manifold.

During the on-stream or cracking portion of the cycle of operation valves 10 and 11 will be in an opened position and valves 12 and 13 in a closed position. Reactants, i. e., fluids to be cracked or otherwise treated, will pass through valve 10 into manifolding chamber 6, thence into conduits 4, from which they will be uniformly distributed through openings 4a throughout the contact mass 3. The fluids, while undergoing transformation or refining, progress from openings 4a to openings 7a, whence they enter conduits 7 through such openings and pass therethrough into outlet manifolding chamber 9 and leave the converter through the duct containing valve 11. When the operation has progressed for a sufficient period so that deposits or contaminants have accumulated upon the contact mass 3 to such an extent that the contact mass is no longer able to effect the desired degree of conversion or treatment of the reactants, valves 10 and 11 may be closed, the pressure reduced and the converter purged of oil vapors or other reactants or products of reaction (e. g., by evacuation or steam purging). Valves 12 and 13 are then opened to permit the circulation of a regeneration medium under pressure, such as air or other oxygen-containing gas, through the converter, thereby to regenerate the contact mass 3 and to remove deposits therefrom. This flow of regeneration fluid may be initiated by starting motor-generator M which drives pump or compressor 14, which in turn sends the air or other fluid through valve 12 into the converter under pressure. After following substantially the same circuit through the conduits and contact mass, as followed by oil vapors or reactants during the cracking step, fluid products of regeneration pass from the converter through duct 13a and valve 13 therein, and thence pass to turbine 15, in which both the pressure and temperature of the stream of reaction products are substantially reduced, a substantial portion of the potential and heat energy, as well as kinetic energy, of the gases being converted into mechanical energy by the turbine, and being used to drive the compressor 14. Compressor 14 is preferably of the turbine type and is capable of imposing on the regeneration fluid pressures of the order of sixty pounds per square inch. The turbine 15 is of a type which has been found to operate well with hot products of combustion as the fluid energy medium such as "hot gas" turbine. The motor M is preferably of the motor-generator type, acting as a motor when current is supplied to it in starting up and then as a generator when full speed has been reached. The compressor 14, turbine 15 and motor M are all operatively connected to a common shaft, the motor M being capable, when acting as a motor, of furnishing about ten per cent of the power required to drive the compressor to supply a full pressure head of regeneration fluid.

It is not necessary that the motor M be capable of furnishing all of the power necessary to operate the compressor, since a small pressure head of regeneration fluid on passing into the gas is expanded and heated by the combustion and then flows out through line 13a to the turbine, imparting further power to the shaft driving the compressor. In this way the turbine quickly picks up the full load and generates additional energy which is used by the motor M acting as a generator. The stream of regeneration fluids emerging from the turbine may be exhausted through duct 16 to a suitable stack, or may be passed through a steam superheater, economizer, preheater, or other heat exchanger, as desired.

As the regeneration step proceeds from its point of beginning, since it is an exothermic reaction, the reaction chamber and the contact mass 3 therein tend to gradually rise in temperature. It is desired to prevent the temperature within the reaction chamber from rising to a level where injury would result to the activity or other properties of the contact mass, for example. Where a silicious contact mass, such as activated hydrosilicate of alumina is employed in the refining or cracking of hydrocarbons, the maximum temperature at which it is desired to have regeneration conducted may be of the order of 1150° F., since above that temperature the catalyst itself, or rather its activity, is destroyed by burning.

Therefore, to control the regeneration temperature as desired, water is fed through duct 17 into the nested or telescoped header 18, located within manifold chamber 9. The inner duct 18a of the header 18 communicated with the inner duct 19a of the nested cooling or heat exchanging tube 19. Hence, water enters through the tubes 18a and 19a and passes from the converter through the annular passages surrounding such tubes and passes out from the converter through duct 20.

The water passing through line 20 is in a highly heated condition and is maintained under pressure so as to prevent the formation of steam. The water then pases through valve 20a in line 20 and due to the lower pressure in evaporator 21, a portion of the water is converted into steam. This steam is led off through line 22 containing valve 22a through which the pressure may be dropped to any degree required, so that the steam after passing valve 22a will be, to a certain degree, superheated. This steam may be used to furnish power for the cracking or treating portion of the cycle or for addition to the vapors being cracked or treated. The water from evaporator 21 is then re-circulated through the heating tubes 19a and 19 by means of pump 23 which imposes on the water sufficient pressure to maintain it liquid at the temperature to which it is heated in the tubes 19 and 19a. The water is fed from the pump 23 to the header 18a through line 17. Due to the fact that a portion of the water is transformed into steam in evaporator 21, additional water must be added, preferably continuously. This is accomplished by means of pump 24 and line 25. It is preferred to operate the water circulating system without very great differences in temperature between the water flowing through line 17 to the catalytic chamber and the water flowing from the chamber to line 20. It is obvious, therefore, that a rapid circulation of water must be maintained and but little of the specific heat of the water in line 20 be converted into latent heat of vaporization in the evaporator 21. It is, of course, obvious that if a large portion of the specific heat contained in the water passing through line 20 be converted into latent heat of vaporization in evaporator 21, that the water flowing from evaporator 21 back to the catalytic chamber will be considerably lower in temperature, thus imposing stress on the catalytic chamber, due to contraction and expansion on the tubes 18, 18a, 19 and 19a. The re-circulation of water between the evaporator to the catalytic chamber will, of course, be governed in such a manner as to maintain the catalytic mass in the chamber 1 at a temperature below that at which the activity of the catalyst 3 would be impaired. It is, of course, readily understandable that the more coke or carbonaceous matter there is deposited during the cracking step, the higher will be the rate of re-circulation, as more heat will be formed by the exothermic regeneration operation.

Figs. 2 and 3 illustrate the cycle of operation of this invention. Six converters are shown, by way of illustration, and are designated as A, B, C, D, E, and F. With the arrangement of cycles of the several converts as indicated in Fig. 3, only one converter will be on-stream at a time. Reactants are supplied to any one of the converters as indicated in Fig. 2, through a manifold duct 10M and reaction products are led away from any of the converters through a manifold duct 11M. For example, when converter A is on-stream, valves 10A and 11A are open and valves 12A and 13A are closed. Then when converter A reaches the end of the on-stream step of its cycle, valves 10A and 11A are closed and valves 10B and 11B are opened. When converter B reaches the end of the on-stream step of its cycle of operation, valves 10B and 11B are closed and valves 10C and 11C are opened, and so forth, with the remaining converters D, E and F. At the end of the on-stream step of the cycle of operation of converter F valves 10F and 11F are closed and valves 10A and 11A, which serve converter A, are opened and the whole process is repeated.

From Fig. 3 it will be seen that with the particular cycle illustrated, at least two converters will be undergoing active regeneration at one time, except when operation of the plant is being initiated and two converters will be in the cracking step of the cycle. Regenerating medium is drawn through duct 14A into pump or compressor 14 and is forced by the latter through manifolding duct 12M. From there it may be fed to converter A, for example, by opening valve 12A, or to converter B by opening 12B, etc.

Products of regeneration pass from converters A, B, C, etc., through valves 13A, 13B, 13C, etc., in manifolding duct 13M, through which they are led to turbine 15, which in turn supplies all, or at least a substantial part of the power acquired to operate compressor 14. Motor-generator M is provided to supply power when the operation is being commenced and to generate electric power when the regeneration gases contain more usable energy than is necessary for the compression of the regeneration medium, or to supply power auxiliary to that developed by turbine 15 in the event of a type of operation wherein the power developed by turbine 15 is not in itself sufficient.

Referring now to Fig. 3, the complete cycle of operation may consist of the following steps:

(1) The on-stream or cracking step;
(2) Oil pressure release or valve adjustment period;
(3) Oil purging period which may be by evacuation or steam purging, for example;
(4) Regeneration which may be effected by the introduction of air or other oxygen-containing gas;
(5) Air pressure release or valve adjustment period; and
(6) Air purging period, which may be by evacuation or purging with steam, flue gases or the like.

The same type of cycle is employed for each of the converters of the unit. The cycles may be of any desired length, such for example as 30 minutes or less or forty-five minutes, one hour or two hours, or more. The length of the on-stream period will always be some fraction of the total length of the cycle, for example $\frac{1}{2}$, $\frac{1}{3}$, $\frac{1}{4}$, more or less of the cycle, depending upon the number of converters in the treating plant or unit, and depending also upon the time necessary for regeneration which will be conditioned upon the particular fluid being treated, the contact mass employed, and various other factors.

While, in Fig. 3 the on-stream period is illustrated as making up only about $\frac{2}{7}$ of the length of the complete cycle, it is to be understood that this is by way of illustration only, and that I recognize and contemplate that the on-stream portion of the cycle may readily make up $\frac{1}{3}$ or more of the total cycle. Likewise, while six converters are shown, I recognize and contemplate that a continuous operation may be provided with less than six, for example, three converters. This may be illustrated with a cycle where each converter is on-stream at staggered periods of 15 minutes each and 30 minutes is allotted in the case of the cycle of each converter for valve adjustment, purging and regeneration, followed by a subsequent purging preliminary to the next on-stream period, it being only necessary to so regulate the on-stream and regeneration periods that there is some overlap in the regeneration period of the various cases, thereby assuring that a constant stream of regeneration products will be flowing to and through the turbine 15.

As a specific example, the regeneration may be carried out at pressures varying between say 65 and 95 pounds per square inch absolute, and be so controlled by circulation of water through the cooling tubes within the case as to furnish combustion gases within the aforestated pressure range and at temperatures between 500 and 1000° F. These gases, on passing through the turbine 15 will be reduced in pressure and temperature, probably leaving the turbine at temperatures between 400 and 500° F. or about 475° F. The water within the cooling tubes would be heated to temperatures approximating 400 to 450° F. necessitating pressures of 200 to 415 pounds per square inch gauge to maintain it in liquid condition. The pressure is reduced by valve 20a at the inlet to the evaporator to provide for the vaporization of any predetermined amount of water in order to convert a portion of the water into steam and thereby convert a portion of the specific heat contained by the water to latent heat of vaporization, cooling the water and placing it in condition for recirculation by means of pump 23 with make up water preferably preheated and admitted through line 25. If the temperature of the water in line 20 is in the neighborhood of 450° F. under a pressure of about 415 pounds per square inch, the pressure may be reduced by means of valve 20a to about 325 pounds and the pressure on the steam passing out through line 22 being reduced to 210 to 315 pounds per square inch.

While it has been stated that pressures of the order of 65 to 95 pounds absolute are preferred for the regeneration step, such high pressures are not necessary for the operation of such turbines, or for the regeneration. For instance, turbines of this type have been operated with gases entering at 31 pounds per square inch absolute and 900° temperature, the gases leaving at 16.5 pounds per square inch absolute and the temperatures in the neighborhood of 700° F. The operation may be adjusted and the turbine 15 and compressor 14 so designed as to provide efficient operation within an extremely wide range of pressures and temperatures.

It is to be understood that the present invention is not restricted to the use of the hot products of the regeneration step in a hot gas turbine, since the rate of re-circulation of water through the tubes 19 and 19a may be so regulated as to extract an extremely high amount of heat from the combustion gases, which heat, of course, is transformed in the evaporator into steam in much greater amounts than would be formed if only a relatively small amount of heat is extracted from the combustion gases as is preferably done when the regeneration gases are to be used in the turbine. In such case the steam issuing from line 22 may be used to drive a steam turbine to take the place of the hot gas turbine 15 to drive the compressor 14. Where the steam generated in evaporator 21 is employed to drive a steam turbine, replacing the turbine 15 shown in the drawings, the hot gases may still contain sufficient heat to be employed in the heat exchanger as a means for superheating the steam from the evaporator before use in the steam turbine.

An arrangement for operating the turbine 15 by means of steam generated in evaporator 21 when operating in the above described manner is as shown in Figure 1. Steam from evaporator 21 flowing through line 22 is caused to flow through line 26 by closing valve 27 in line 22 and opening valve 28 in line 26. Steam for operating the turbine will thus flow from evaporator 21 through lines 22, 26 and line 13a to the inlet of turbine 15. At the same time the hot products of combustion from regeneration flowing through line 13a may be by-passed through line 29 by opening valve 30 therein and closing valve 31 in line 13a. With valves 30 and 31 so set, the flue gases will flow through line 29 to heat exchanger 32 where they pass in indirect heat exchange relation with and superheat the steam flowing to the turbine through line 26. The flue gases are removed from heat exchanger 32 through line 33, the pressure on the flue gases preferably being maintained at substantially the pressure used for regeneration by regulating valve 34 in line 33.

It will readily be seen that a large number of combinations of the various elements shown, and others not shown but described, may be used to carry out regeneration of a catalytic mass under pressure with quantitative recovery of the energy so developed, all of which combinations being within the scope of the present invention.

It is to be understood that the invention herein described is not limited to use with any particular catalyst, or class of catalysts, but is applicable to any process using a catalyst which becomes contaminated with an oxidizable or combustible material, for instance metallic catalysts in lump or finely divided form or metallic catalysts in finely divided form impregnated on pumice, china clay, or other inert supporter, or catalysts composed of metallic oxides or salts, etc. in lump or finely divided form, or impregnated on carrier substance. Any of the catalysts may have incorporated therewith promotors in any form whatever, such as metallic oxides or salts in finely divided or other forms, the only restriction being that the catalytic reaction deposits on the catalyst or promotor an oxidizable or combustible contaminating substance or poison.

What I claim and desire to protect by Letters Patent is as follows:

1. In the process of catalytically treating petroleum hydrocarbons in which separate catalytic bodies are successively contacted with hydrocarbons in vapor phase with resultant formation thereon of oxidizable carbonaceous contaminants and in which each catalyst body is regenerated, after shutting off the flow of hydrocarbons thererto, by flowing into contact with the catalyst a gas adapted to oxidize said contaminants, the improvement which comprises maintaining the oxidizing gas during the greater part of its flow under an absolute pressure not less than 30 pounds absolute to the square inch, and so regulating the pressure and rate of flow that the temperature of the entering gases will approach but not substantially exceed 1150° F. and that the pressure of the gases leaving the catalytic zone will not substantially exceed 95 pounds absolute to the square inch; thereby materially shortening the period of regeneration and prolonging the time interval occupied by the catalysis of the hydrocarbons relative to the total elapsed time required for catalysis and regeneration and utilizing the energy contained in the combustion products formed in said regeneration in the generation of power.

2. In the process of catalytically treating petroleum hydrocarbons in which separate catalytic bodies are successively contacted with hydrocarbons in vapor phase with resultant formation thereon of oxidizable carbonaceous contaminants and in which each catalyst body is regenerated, after shutting off the flow of hydrocarbons thereto, by flowing into contact with the catalyst a gas adapted to oxidize said contaminants, the improvement which comprises maintaining the oxidizing gas throughout substantially the said regenerating procedure under a substantially constant superatmospheric pressure substantially in excess of that required to force said gas through the catalytic zone and sufficiently high, namely, not less than 30 pounds absolute to the square inch, to materially shorten the period of regeneration and so limiting the pressure and rate of flow that the temperature of regeneration will not be so high, namely, in excess of 1150° F., as to impair the activity of the catalyst, and utilizing energy contained in the combustion products formed in said regeneration to effect the compression of fresh oxidizing gas supplied to a catalytic zone during the period of regeneration of the catalyst therein.

3. In the process of catalytically treating petroleum hydrocarbons in which separate catalytic bodies are successively contacted with hydrocarbons in vapor phase with resultant formation thereon of oxidizable carbonaceous contaminants and in which each catalyst body is regenerated, after shutting off the flow of hydrocarbons thereto, by flowing into contact with the catalyst a gas adapted to oxidize said contaminants, the improvement which comprises maintaining the oxidizing gas throughout substantially the said regenerating procedure under a substantially constant superatmospheric pressure substantially in excess of that required to force said gas through the catalytic zone and sufficiently high, namely, not less than 30 pounds absolute to the square inch, to materially shorten the period of regeneration and so limiting the pressure and rate of flow that the temperature of regeneration will not be so high, namely, in excess of 1150° F., as to impair the activity of the catalyst; utilizing within the catalytic zone a portion of the energy contained in the combustion products formed in said regeneration to generate steam and flowing the combustion products deprived of part of this energy from said zone and utilizing energy remaining therein to effect the compression of fresh oxidizing gas supplied to a catalytic zone during the period of regeneration therein.

4. In the process of catalytically treating petroleum hydrocarbons in which separate catalytic bodies are successively contacted with hydrocarbons in vapor phase with resultant formation thereon of oxidizable carbonaceous contaminants and in which each catalyst body is regenerated, after shutting off the flow of hydrocarbons thereto, by flowing into contact with the catalyst a gas adapted to oxidize said contaminants, the improvement which comprises maintaining the oxidizing gas throughout substantially the said regenerating procedure under a substantially constant superatmospheric pressure substantially in excess of that required to force said gas through the catalytic zone and sufficiently high, namely, not less than 30 pounds absolute to the square inch, to materially shorten the period of regeneration and so limiting the pressure and rate of flow that the temperature of regeneration will not be so high, namely, in excess of 1150° F., as to impair the activity of the catalyst, and utilizing within the catalytic zone a portion of the energy contained in the combustion products formed in such regeneration to generate steam and utilizing the energy of said steam to effect the compression of fresh oxidizing gas supplied to a catalytic zone during the period of regeneration therein.

RICHARD S. VOSE.